United States Patent
Cao

(10) Patent No.: US 9,894,214 B2
(45) Date of Patent: Feb. 13, 2018

(54) METHOD AND APPARATUS FOR ENABLING SUBSCRIBER LINES TO JOIN DSL VECTORING SYSTEM, AND DSL VECTORING SYSTEM

(71) Applicant: Huawei Technologies Co., Ltd., Shenzhen (CN)

(72) Inventor: Yongwu Cao, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 540 days.

(21) Appl. No.: 14/561,052

(22) Filed: Dec. 4, 2014

(65) Prior Publication Data

US 2015/0085857 A1 Mar. 26, 2015

Related U.S. Application Data

(63) Continuation of application No. PCT/CN2012/076481, filed on Jun. 5, 2012.

(51) Int. Cl.
  *H04M 11/06* (2006.01)
  *H04B 3/32* (2006.01)

(52) U.S. Cl.
  CPC ............ *H04M 11/062* (2013.01); *H04B 3/32* (2013.01)

(58) Field of Classification Search
  CPC .......... H04L 5/023; H04B 3/32; H04M 3/304; H04M 3/34; H04M 3/2209; H04M 3/30
  See application file for complete search history.

(56) References Cited

U.S. PATENT DOCUMENTS

| | | |
|---|---|---|
| 2002/0191760 A1 | 12/2002 | Wattwood et al. |
| 2003/0112860 A1 | 6/2003 | Erdogan |
| 2006/0159232 A1* | 7/2006 | Jiang .................. H04M 3/2209 379/1.03 |
| 2010/0046684 A1* | 2/2010 | De Lind Van Wijngaarden ....... H04B 3/487 375/363 |

(Continued)

FOREIGN PATENT DOCUMENTS

| | | |
|---|---|---|
| CN | 1798426 A | 7/2006 |
| CN | 1992731 A | 7/2007 |

(Continued)

OTHER PUBLICATIONS

"Series G: Transmission Systems and Media, Digital Systems and Networks; Digital Sections and Digital Line System—Access Networks," ITU-T Telecommunication Standardization Sector of ITU, G.993.5, Apr. 2010, 80 pages.

*Primary Examiner* — Romani Ohri
(74) *Attorney, Agent, or Firm* — Slater Matsil, LLP

(57) ABSTRACT

The present invention discloses a method and an apparatus for enabling subscriber lines to join a DSL vectoring system the DSL vectoring system and can shorten overall joining time of subscriber lines in a DSL system. The method includes grouping subscriber lines into at least two groups according to time when the subscriber lines request to go online, where the at least two groups of subscriber lines that are obtained after the grouping include a first group of subscriber lines and a second group of subscriber lines; starting a joining process for all the subscriber lines in the first group of subscriber lines; and during the joining process of the first group of subscriber lines, putting all the subscriber lines in the second group of subscriber lines into a joining process.

20 Claims, 13 Drawing Sheets

Group subscriber lines into at least two groups according to time when the subscriber lines request to go online, where the at least two groups of subscriber lines that are obtained after the grouping include a first group of subscriber lines and a second group of subscriber lines, and time when the first group of subscriber lines request to go online is earlier than time when the second group of subscriber lines request to go online  —101

Put all subscriber lines in the first group of subscriber lines into an joining process  —102

During the joining process of the first group of subscriber lines, when the first group of subscriber lines reach starting moments of specified vectoring steps, put all subscriber lines in the second group of subscriber lines into an joining process  —103

(56) References Cited

U.S. PATENT DOCUMENTS

| | | | | |
|---|---|---|---|---|
| 2010/0074312 A1* | 3/2010 | Cioffi | .................... | H04M 11/062 |
| | | | | 375/222 |
| 2010/0232486 A1* | 9/2010 | Starr | ........................ | H04B 3/32 |
| | | | | 375/222 |
| 2011/0080938 A1* | 4/2011 | Fisher | ...................... | H04B 3/32 |
| | | | | 375/222 |
| 2011/0261674 A1* | 10/2011 | Maes | ...................... | H04B 3/487 |
| | | | | 370/201 |
| 2011/0286503 A1 | 11/2011 | Cioffi et al. | | |
| 2013/0142319 A1* | 6/2013 | Lu | ............................ | H04B 3/32 |
| | | | | 379/93.08 |
| 2015/0071336 A1* | 3/2015 | Kerpez | ................... | H04B 3/32 |
| | | | | 375/227 |
| 2015/0146767 A1* | 5/2015 | Kerpez | ............. | H04L 25/03828 |
| | | | | 375/227 |

FOREIGN PATENT DOCUMENTS

| | | |
|---|---|---|
| CN | 101478464 A | 7/2009 |
| CN | 101536482 A | 9/2009 |
| CN | 101610593 A | 12/2009 |
| CN | 102413580 A | 4/2012 |
| CN | 102833438 A | 12/2012 |
| EP | 2200185 A1 | 6/2010 |

* cited by examiner

|   | x |   |   |   |   |   |
|---|---|---|---|---|---|---|
| Upstream vectoring step 1 | Upstream vectoring step 2 | Upstream vectoring step 3 | Upstream vectoring step 4 | ...... |   |   |
|   |   | Upstream vectoring step 1 | Upstream vectoring step 2 | Upstream vectoring step 3 | Upstream vectoring step 4 | ...... |

FIG. 3b

|   | x |   |   |   |   |   |
|---|---|---|---|---|---|---|
| Downstream vectoring step 1 | Downstream vectoring step 2 | Downstream vectoring step 3 | Downstream vectoring step 4 | ...... |   |   |
|   |   | Downstream vectoring step 1 | Downstream vectoring step 2 | Downstream vectoring step 3 | Downstream vectoring step 4 | ...... |

METHOD AND APPARATUS FOR ENABLING SUBSCRIBER LINES TO JOIN DSL VECTORING SYSTEM, AND DSL VECTORING SYSTEM

CROSS-REFERENCE TO RELATED APPLICATIONS

This application is a continuation of International Application No. PCT/CN2012/076481, filed on Jun. 5, 2012, which is hereby incorporated by reference in its entirety.

TECHNICAL FIELD

The present invention relates to the field of communications technologies and, in particular embodiments, to a method and an apparatus for enabling subscriber lines to join a DSL vectoring system, and a DSL vectoring system.

BACKGROUND

A DSL (digital subscriber line) is a high-speed data transmission technology for transmission by telephone twisted pairs. Generally, DSL services are provided for multiple subscribers in a bundle of cables. A system providing multi-channel DSL access is called DSLAM (access multiplexer). Due to the electromagnetic induction principle, crosstalk may be mutually generated among multiple channels of signal received by the DSLAM, which causes problems such as a low line speed, unstable performance, and even a service provisioning failure. Currently, a DSL vectoring technology is mainly used to perform receiving and transmission in a united manner on the multiple channels of signal at a DSLAM end, and a signal processing method is used to eliminate the crosstalk.

In a DSL vectoring system, an initialization process includes multiple downstream vectoring steps and upstream vectoring steps; a subscriber line needs to pass through the foregoing vectoring steps (that is, a joining state) to ultimately reach an online state. When there is a subscriber line that is already in a joining process, other subscriber lines can join the DSL vectoring system until the subscriber line that is joining the DSL vectoring system reaches the online state. An ideal condition is that all subscriber lines pass through the vectoring steps together and reach the online state at the same time, and each subscriber does not need to wait other subscribers. However, actually, there is a low probability that all subscriber lines join a DSL vectoring system at the same time; as a result, the subscriber line that joins the DSL vectoring system later needs to wait for relatively long time. In addition, a common resource of the system is wasted.

SUMMARY

Embodiments of the present invention provide a method and an apparatus for enabling subscriber lines to join a DSL vectoring system, and a DSL vectoring system, which can shorten overall joining time of subscriber lines in a DSL vectoring system and save a common resource.

To achieve the preceding objective, the embodiments of the present invention adopt the following technical solutions.

A method for enabling subscriber lines to join a DSL vectoring system, where the method includes: grouping subscriber lines into at least two groups according to time when the subscriber lines request to go online, where the at least two groups of subscriber lines that are obtained after the grouping include a first group of subscriber lines and a second group of subscriber lines, and time when all subscriber lines in the first group of subscriber lines request to go online is earlier than time when all subscriber lines in the second group of subscriber lines request to go online; starting a joining process for all the subscriber lines in the first group of subscriber lines; and during the joining process of the first group of subscriber lines, when the first group of subscriber lines reach a starting moment of a specified vectoring step, putting all the subscriber lines in the second group of subscriber lines into a joining process.

An apparatus for enabling subscriber lines to join a DSL vectoring system, where the apparatus includes: a grouping unit, configured to group subscriber lines into at least two groups according to time when the subscriber lines request to go online, where the at least two groups of subscriber lines that are obtained after the grouping include a first group of subscriber lines and a second group of subscriber lines, and time when all subscriber lines in the first group of subscriber lines request to go online is earlier than time when all subscriber lines in the second group of subscriber lines request to go online; a first joining unit, configured to start a joining process for all the subscriber lines in the first group of subscriber lines; and a second joining unit, configured to: during the joining process of the first group of subscriber lines, when the first group of subscriber lines reach a starting moment of a specified vectoring step, put all the subscriber lines in the second group of subscriber lines into a joining process.

A DSL vectoring system, where the system includes: an joining apparatus, multiple customer premises equipments (CPE), and subscriber lines that connect each CPE and the joining apparatus, where the CPEs are configured to send a request to go online to the joining apparatus, and the joining apparatus is configured to: group, according to time when CPEs request to go online, subscriber lines corresponding to the CPEs that request to go online into at least two groups, where the at least two groups of subscriber lines that are obtained after the grouping include a first group of subscriber lines and a second group of subscriber lines, and time when all subscriber lines in the first group of subscriber lines request to go online is earlier than time when all subscriber lines in the second group of subscriber lines request to go online; start a joining process for all the subscriber lines in the first group of subscriber lines; and during the joining process of the first group of subscriber lines, when the first group of subscriber lines reach a starting moment of a specified vectoring step, put all the subscriber lines in the second group of subscriber lines into a joining process.

According to the method and apparatus for enabling subscriber lines to join a DSL vectoring system, and the DSL vectoring system provided in the embodiments of the present invention, subscriber lines are grouped into at least two groups according to time when the subscriber lines request to go online, including a first group of subscriber lines with earlier time of requesting for getting online and a second group of subscriber lines with later time of requesting for getting online; during a joining process of the first group of subscriber lines, when the first group of subscriber lines reach a starting moment of a specified vectoring step, the second group of subscriber lines start to join the DSL vectoring system, so that groups of subscriber lines that are in different joining processes can coexist, and it is not required that the second group of subscriber lines join the DSL vectoring system until the entire joining process of the first group of subscriber lines is complete, thereby shortening overall joining time of the subscriber lines in a DSL system and saving a common resource.

BRIEF DESCRIPTION OF THE DRAWINGS

FIG. 3a to FIG. 3c are schematic diagrams of putting all the subscriber lines in the second group of subscriber lines into a joining process in step 103 of FIG. 1;

FIG. 7 is a schematic diagram of joining groups of subscriber lines in the method shown in FIG. 6;

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
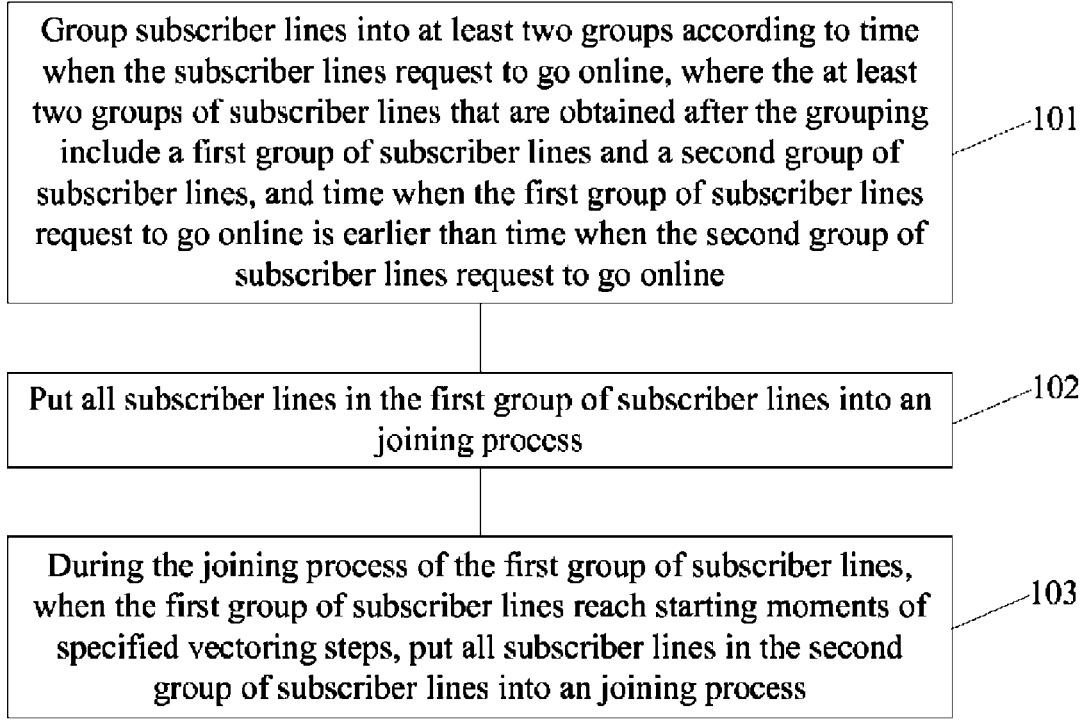
FIG. 1 is a flowchart of a method for enabling subscriber lines to join a DSL vectoring system according to an embodiment of the present invention.

An embodiment of the present invention provides a method for enabling subscriber lines to join a DSL vectoring system. As shown in FIG. 1, the method includes the following steps.

101. Group subscriber lines into at least two groups according to time when the subscriber lines request to go online, where the at least two groups of subscriber lines that are obtained after the grouping include a first group of subscriber lines and a second group of subscriber lines, and time when all subscriber lines in the first group of subscriber lines request to go online is earlier than time when all subscriber lines in the second group of subscriber lines request to go online.

There may be many manners of grouping the subscriber lines into at least two groups according to the time when the subscriber lines request to go online. Preferably, the subscriber lines may be grouped into at least two groups according to a principle that all subscriber lines in each group of subscriber lines have same or similar time of requesting to go online. For example, in a period of time, there are a total of ten subscriber lines requesting to go online. Time when five subscriber lines request to go online is a, time when three subscriber lines request to go online is b, and time when two subscriber lines request to go online is c, where time a is earlier than time b, and time b is earlier than time c. Then, the five subscriber lines whose time of requesting to go online is a may be grouped as a first group of subscriber lines; the three subscriber lines whose time of requesting to go online is b may be grouped as a second group of subscriber lines; the two subscriber lines whose time of requesting to go online is c may be grouped as a third group of subscriber lines.

It should be understood that, for consideration of simplifying a joining process, two or multiple groups of subscriber lines that have relatively close time of requesting to go online may be grouped into a same group. For example, in the foregoing example, if time b and time c are very close, the third group of subscriber lines may also be merged into the second group of subscriber lines, that is, the subscriber lines are grouped into only two groups, thereby simplifying a joining process. Certainly, this embodiment of the present invention is not limited to the foregoing manner of grouping the subscriber lines. A person skilled in the art can group, according to common knowledge or commonly used technical means, subscriber lines into at least two groups according to time when the subscriber lines request to go online.

It should be noted that appellations of the first group of subscriber lines and the second group of subscriber lines in this step are only for a need of description, that is, the time when the first group of subscriber lines request to go online is earlier than the time when the second group of subscriber lines request to go online. In addition, the appellations of the first group of subscriber lines and the second group of subscriber lines do not limit the number of groups into which the subscriber lines are grouped to two. A person skilled in the art may understand that, in a joining process of subscriber lines in a DSL system, some subscriber lines may further be included before the time when the first group of subscriber lines request to go online, and these subscriber lines have joined a DSL vectoring system later and/or are joining the DSL vectoring system; some subscriber lines may further be included after the time when the second group of subscriber lines request to go online, and these subscriber lines are requesting to go online and/or are ready to request to go online.

102. Start a joining process for all the subscriber lines in the first group of subscriber lines.

After the first group of subscriber lines start to join the DSL vectoring system, all the subscriber lines in the first group of subscriber lines enter a joining process, that is, in a joining process. All subscriber lines pass through multiple vectoring steps during a joining process. A sequence and content of the vectoring steps which the subscriber lines pass through during the joining process are not completely the same according to different chips of COs (Central Office, central office) from different chip vendors. The vectoring steps are upstream vectoring steps and/or downstream vectoring steps. For example, the vectoring steps which the subscriber lines pass through may all be upstream vectoring steps, such as an upstream vectoring step 1, an upstream vectoring step 2, . . . , or may all be downstream vectoring steps, such as a downstream vectoring step 1, a downstream vectoring step 2, . . . , or may include both downstream vectoring steps and upstream vectoring steps, such as, a downstream vectoring step 1, an upstream vectoring step 1, a downstream vectoring step 2, a downstream vectoring step 3, and an upstream vectoring step 2, . . . .

In this embodiment of the present invention, in order to provide more joining points for subscriber lines (the second group of subscriber lines) that joins the DSL vectoring system later, preferably, during the joining process, all the subscriber lines in the first group of subscriber lines and all the subscriber lines in the second group of subscriber lines sequentially pass through a downstream vectoring step 1, an upstream vectoring step 1, a downstream vectoring step 2, an upstream vectoring step 2, a downstream vectoring step 3, an upstream vectoring step 3, and an upstream and downstream vectoring step 4, and specified vectoring steps are the downstream vectoring step 1, the downstream vectoring step 2, the downstream vectoring step 3, and the upstream and downstream vectoring step 4. The upstream and downstream vectoring step 4 is a vectoring step formed after an upstream vectoring step 4 is merged into a downstream vectoring step 4. When the subscriber lines reach the upstream and downstream vectoring step 4, the subscriber lines start to pass through the downstream vectoring step 4 and the upstream vectoring step 4 at the same time.

Certainly, vectoring steps which each subscriber line passes through during the joining process are not limited by this embodiment of the present invention. A person skilled in the art can decide, according to common knowledge or commonly used technical means, the vectoring steps which each subscriber line passes through during the joining process. For example, the downstream vectoring step 1 may further be merged with the subsequent upstream vectoring step 1, to form an upstream and downstream vectoring step 1, and during the joining process of the subscriber lines, the downstream vectoring step 1 and the upstream vectoring step 1 are passed through at the same time. In this way, the first group of subscriber lines reach a steady online state ultimately after sequentially passing through the vectoring steps.

103. During the joining process of the first group of subscriber lines, when the first group of subscriber lines reach a starting moment of a specified vectoring step, put all the subscriber lines in the second group of subscriber lines into a joining process.

The specified vectoring step refers to a vectoring step, relative to a moment when the second group of subscriber lines request to go online, which the first group of subscriber lines have not passed through and which have a same type as a starting vectoring step (that is, the first vectoring step which the second group of subscriber lines pass through) of the second group of subscriber lines. A same type means that vectoring steps are both upstream vectoring steps or downstream vectoring steps. It can be seen that there may be one or more specified vectoring steps as a joining point of the second group of subscriber lines.

Figure 2A:
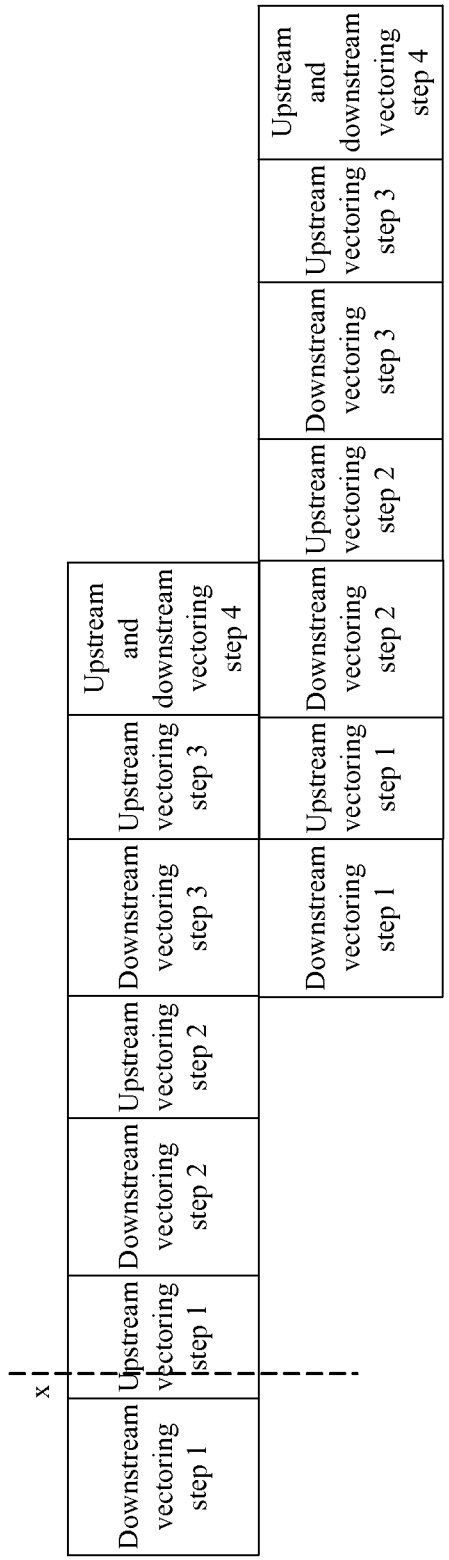
FIG. 2a to FIG. 2c are schematic diagrams of putting all subscriber lines in a second group of subscriber lines into a joining process in step 103 of FIG. 1.
Figure 2B:
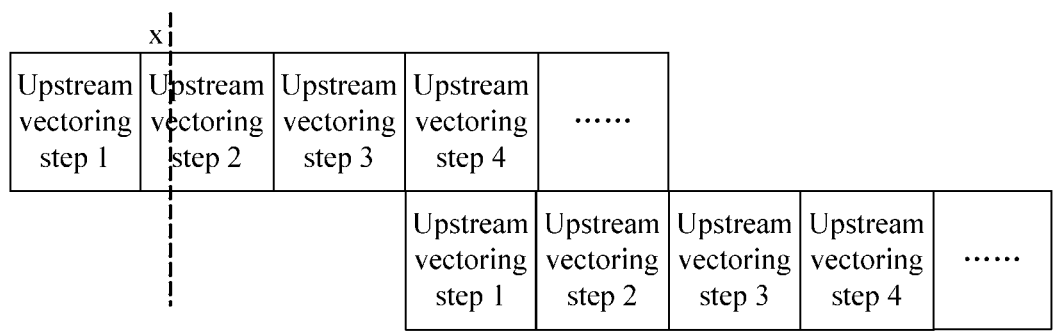
Figure 2C:
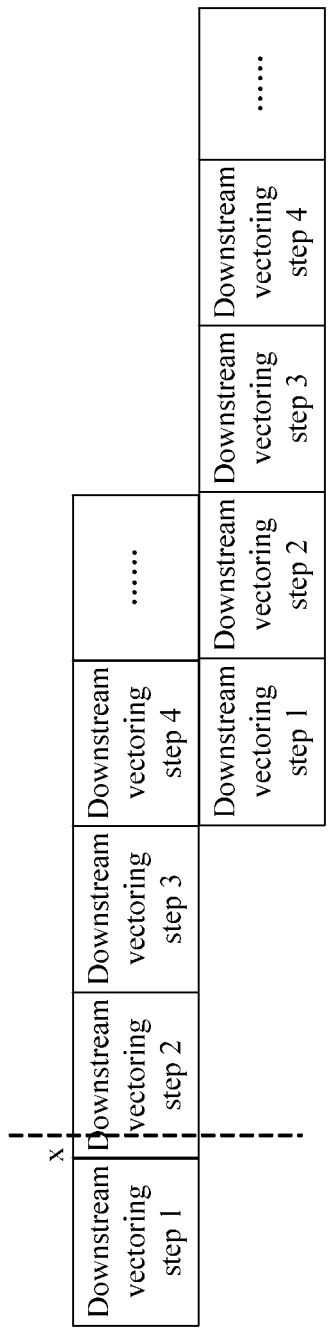

In the following, three specific examples are used to explain the specified vectoring steps and this step. FIG. 2a to FIG. 2c are schematic diagrams of starting to enable the second group of subscriber lines to join a DSL vectoring system later when the first group of subscriber lines reach a starting moment of the specified vectoring step. Vectoring steps which the subscriber lines pass through in FIG. 2a, FIG. 2b, and FIG. 2c are different. It should be noted that, in the diagrams, the vectoring steps which the subscriber lines pass through during the joining process are only for a need of description, but actual vectoring steps are not limited to the passed vectoring steps in the diagrams.

In FIG. 2a, during the joining process, the subscriber lines sequentially pass through the downstream vectoring step 1, the upstream vectoring step 1, the downstream vectoring step 2, the upstream vectoring step 2, the downstream vectoring step 3, the upstream vectoring step 3, and the upstream and downstream vectoring step 4. In FIG. 2a, the time when the second group of subscriber lines request to go online is b, and at this time, the first group of subscriber lines reach a point x of the upstream vectoring step 1; therefore, relative to time b, the vectoring steps which the first group of subscriber lines have not passed through and which have the same type as the starting vectoring step of the second group of subscriber lines are the downstream vectoring step 2, the downstream vectoring step 3, and the upstream and downstream vectoring step 4.

In this case, the specified vectoring steps are the downstream vectoring step 2, the downstream vectoring step 3, and the upstream and downstream vectoring step 4. In this step, when the first group of subscriber lines reach the starting moment of the specified vectoring step, that is, a starting moment of the downstream vectoring step 2, the downstream vectoring step 3, or the upstream and downstream vectoring step 4, the second group of subscriber lines start to join the DSL vectoring system. After the second group of subscriber lines start to join the DSL vectoring system, the second group of subscriber lines are in a joining process. And similar to the joining process of the first group of subscriber lines, the second group of subscriber lines sequentially pass through the downstream vectoring steps and upstream vectoring steps, and ultimately complete the entire joining process.

In FIG. 2b, during the joining process, the subscriber lines sequentially pass through the upstream vectoring step 1, the upstream vectoring step 2, and the upstream vectoring step 3 . . . . The time when the second group of subscriber lines request to go online is b, and at this time, the first group of subscriber lines reach a point x of the upstream vectoring step 1; therefore, the specified vectoring steps are the upstream vectoring step 3 and the upstream vectoring step 4 . . . . Similarly, in FIG. 2c, the specified vectoring steps are the downstream vectoring step 3 and the downstream vectoring step 4 . . . .

It should be noted that, in a case in which downstream vectoring steps and upstream vectoring steps are both included, and they are not totally alternate, for example, the downstream vectoring step 1, the upstream vectoring step 1, the downstream vectoring step 2, the downstream vectoring step 3, the upstream vectoring step 2, . . . , some vectoring steps may be skipped so as to provide more joining points, for example, the downstream vectoring step 3 may be skipped in the foregoing case.

According to the method for enabling subscriber lines to join a DSL vectoring system provided in this embodiment of the present invention, subscriber lines are grouped into at least two groups according to time when the subscriber lines request to go online, including a first group of subscriber lines with earlier time of requesting to go online and a second group of subscriber lines with later time of requesting to go online; during a joining process of the first group of subscriber lines, when the first group of subscriber lines reach a starting moment of a specified vectoring step, the second group of subscriber lines start to join the DSL vectoring system, so that groups of subscriber lines that are in different joining processes can coexist, and it is not required that the second group of subscriber lines join the DSL vectoring system until the entire joining process of the first group of subscriber lines is complete, thereby shortening overall joining time of the subscriber lines in a DSL system and saving a common resource.

Preferably, in an embodiment of the present invention, the specified vectoring steps are a specified vectoring step which is to be passed through by the first group of subscriber lines during the joining process, that is, an earliest specified vectoring step according to a passing sequence in specified vectoring steps which the first group of subscriber lines have not passed through. Step 103 specifically is: during the joining process of the first group of subscriber lines, when the first group of subscriber lines reach a starting moment of a specified vectoring step that is to be passed through, start to enable the second group of subscriber lines to join the DSL vectoring system later.

Figure 3A:
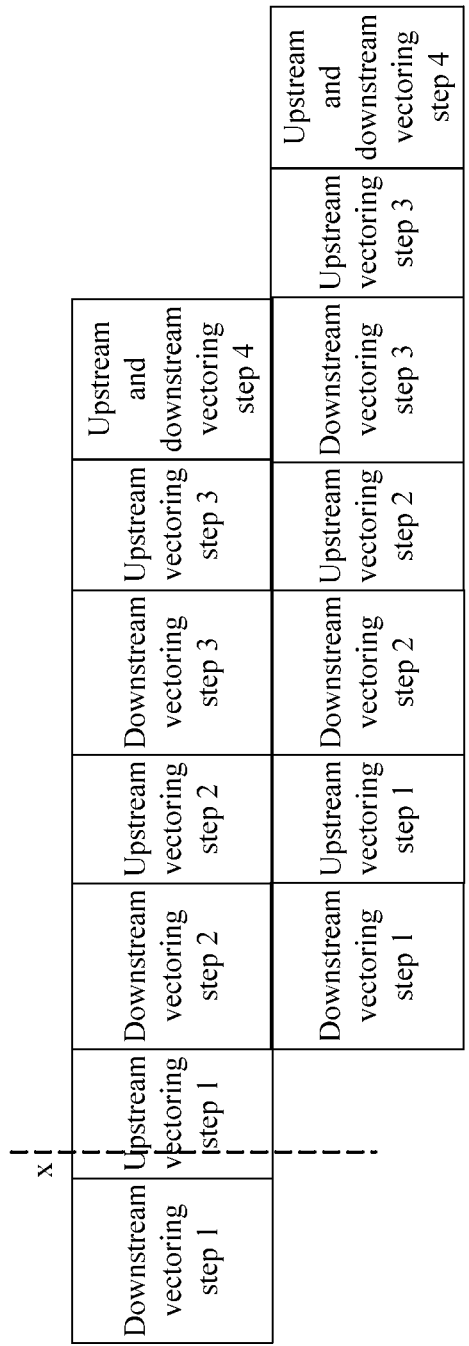

FIG. 3a to FIG. 3c show optimized manners, which are corresponding to FIG. 2a to FIG. 2c, of joining the second group of subscriber lines in this embodiment. In FIG. 3a, the specified vectoring steps are the downstream vectoring step 2 of the first group of subscriber lines, and therefore, in step 103, the second group of subscriber lines start to join a DSL vectoring system at the starting moment of the downstream vectoring step 2 of the first group of subscriber lines; in FIG. 3b, the specified vectoring steps are the upstream vectoring step 3, and therefore, in step 103, the second group of subscriber lines start to join the DSL vectoring system at the starting moment of the upstream vectoring step 3 of the first group of subscriber lines; similarly, in FIG. 3c, the specified vectoring steps are the downstream vectoring step 3, and therefore, in step 103, the second group of subscriber lines start to join the DSL vectoring system at the starting moment of the downstream vectoring step 3 of the first group of subscriber lines.

According to the joining method provided in this embodiment of the present invention, during the joining process of the first group of subscriber lines, the second group of subscriber lines start to join the DSL vectoring system when the first group of subscriber lines reach the starting moment of the specified vectoring step that is to be passed through, thereby maximally shortening overall joining time of the subscriber lines in a DSL system and maximally saving a common resource.

Figure 4:
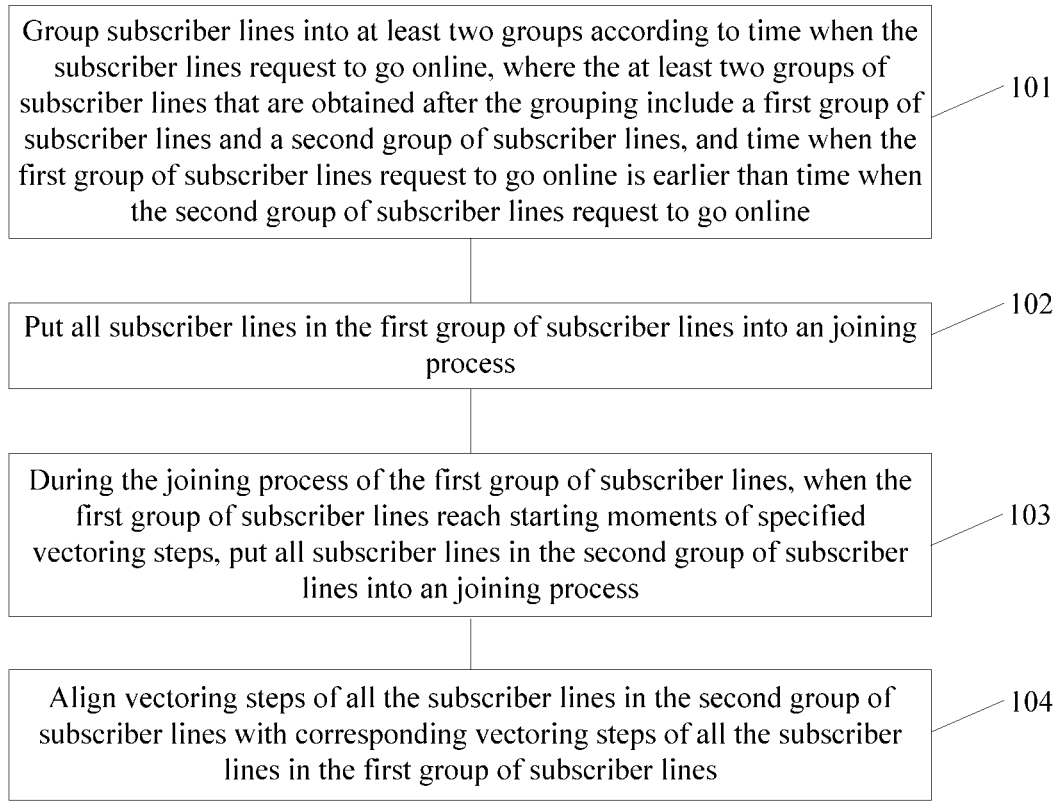
FIG. 4 is a flowchart of another method for enabling subscriber lines to join a DSL vectoring system according to an embodiment of the present invention.

In an embodiment provided by the present invention, as shown in FIG. 4, after step 103, step 104 is further includes alignment of vectoring steps of all the subscriber lines in the second group of subscriber lines with corresponding vectoring steps of all the subscriber lines in the first group of subscriber lines.

Firstly, a meaning of aligning is described: because time when subscriber lines in each group of subscriber lines request to join a DSL vectoring system or time when the subscriber lines in each group of subscriber lines reach a corresponding vectoring step is not exactly the same, when a subscriber line just reaches a starting moment of a vectoring step, the subscriber line needs to wait for other subscriber lines in each group of subscriber lines to enter, that is, aligning.

In this step, because the second group of subscriber lines join the DSL vectoring system during the joining process of the first group of subscriber lines, except that each subscriber line in each group of subscriber lines needs to be aligned, upstream vectoring steps of all the subscriber lines in the second group of subscriber lines need to be aligned with corresponding upstream vectoring steps of all the subscriber lines in the first group of subscriber lines, and/or, downstream vectoring steps of all the subscriber lines in the second group of subscriber lines need to be aligned with corresponding downstream vectoring steps of all the subscriber lines in the first group of subscriber lines.

As shown in FIG. 2a, the downstream vectoring step 1 of the second group of subscriber lines is aligned with the corresponding downstream vectoring step 3 of the first group of subscriber lines, and then the subsequent upstream vectoring step 1 and the downstream vectoring step 2 of the second group of subscriber lines are sequentially aligned with the corresponding upstream vectoring step 3 and the upstream and downstream vectoring step 4 of the first group of subscriber lines. Corresponding vectoring steps of the first group of subscriber lines and the second group of subscriber lines are aligned, so that the two groups of subscriber lines may enter and exit aligned vectoring steps together, that is, the aligned vectoring steps are passed through together.

Figure 5:
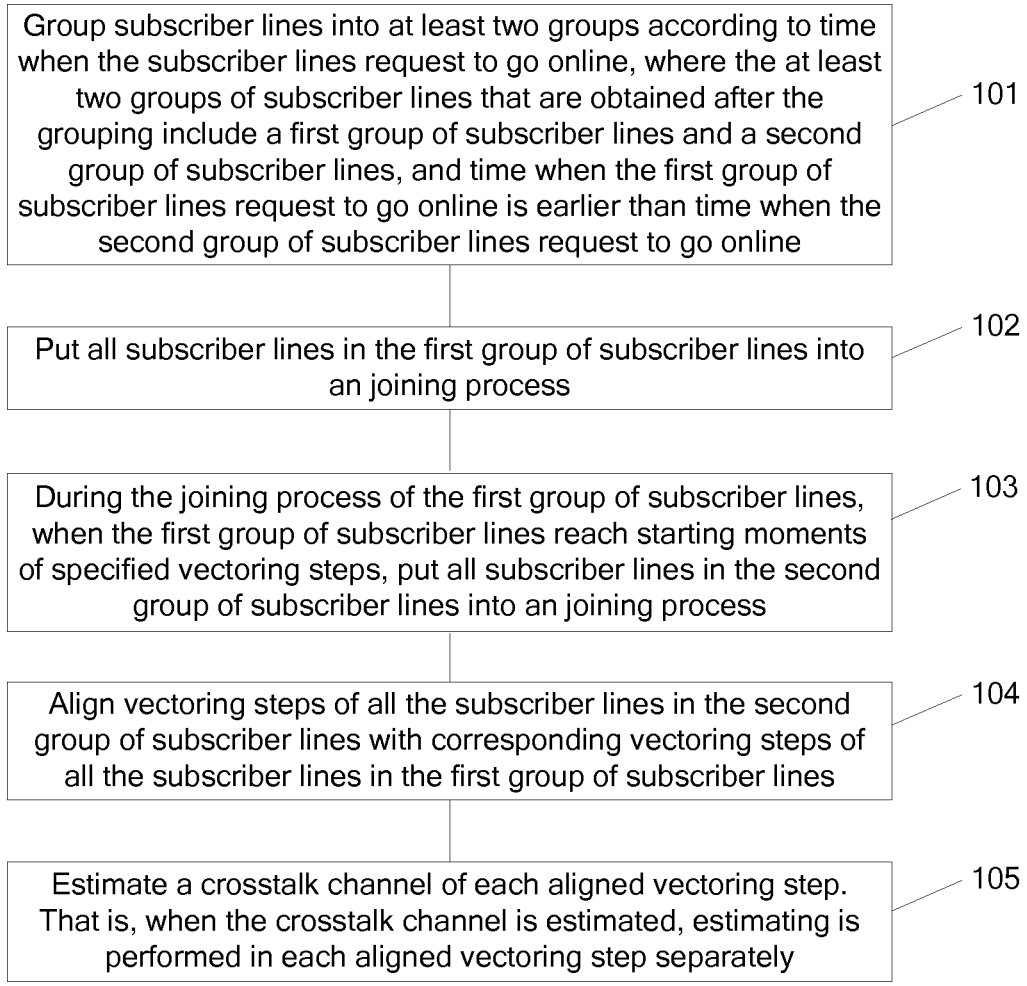
FIG. 5 is a flowchart of another method for enabling subscriber lines to join a DSL vectoring system according to an embodiment of the present invention.

According to the joining method provided in this embodiment of the present invention, the second group of subscriber lines are allowed to join the DSL vectoring system when the first group of subscriber lines are joining the DSL vectoring system, that is, multiple groups of subscriber lines can coexist; therefore, in order to better estimate a crosstalk channel to ultimately eliminate crosstalk, in another embodiment provided by the present invention, as shown in FIG. 5, after step 104, step 105 is further included: estimate a crosstalk channel of each aligned vectoring step. That is, the crosstalk channel is estimated in each aligned vectoring step separately.

In this step, an impact of a subscriber line that is joining the DSL vectoring system on a subscriber line that has joined the DSL vectoring system later and is in a steady online state, an impact between subscriber lines that are joining the DSL vectoring system, and an impact of a subscriber line that has joined the DSL vectoring system later and is in a steady online state on a subscriber line that is joining the DSL vectoring system are mainly estimated. After the estimating is finished, each group of subscriber lines exit the vectoring step together and enter a next vectoring step, and aligning and estimating are performed. By the estimating in each vectoring step, an entire crosstalk channel is accurately estimated, which facilitates eliminating crosstalk and reducing noise.

Figure 6:
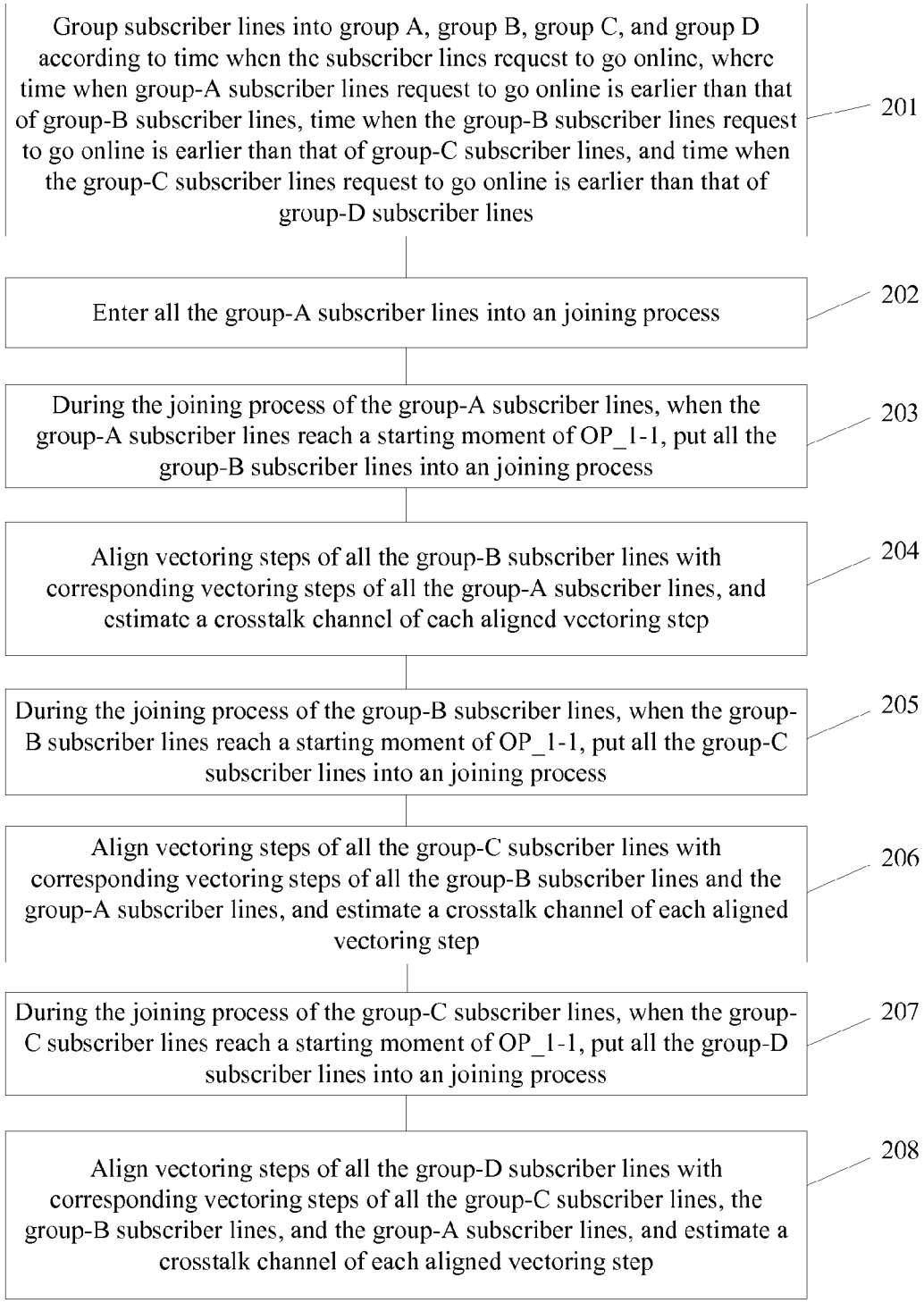
FIG. 6 is a flowchart of a method for enabling subscriber lines to join a DSL vectoring system according to an embodiment of the present invention.

In the following, a preferable method for enabling subscriber lines to join a DSL vectoring system is described in detail by using a specific embodiment. As shown in FIG. 6, the method includes the following steps.

201. Group subscriber lines into group A, group B, group C, and group D according to time when the subscriber lines request to go online, where time when group-A subscriber lines request to go online is earlier than that of group-B subscriber lines, time when the group-B subscriber lines request to go online is earlier than that of group-C subscriber lines, and time when the group-C subscriber lines request to go online is earlier than that of group-D subscriber lines.

Figure 7:
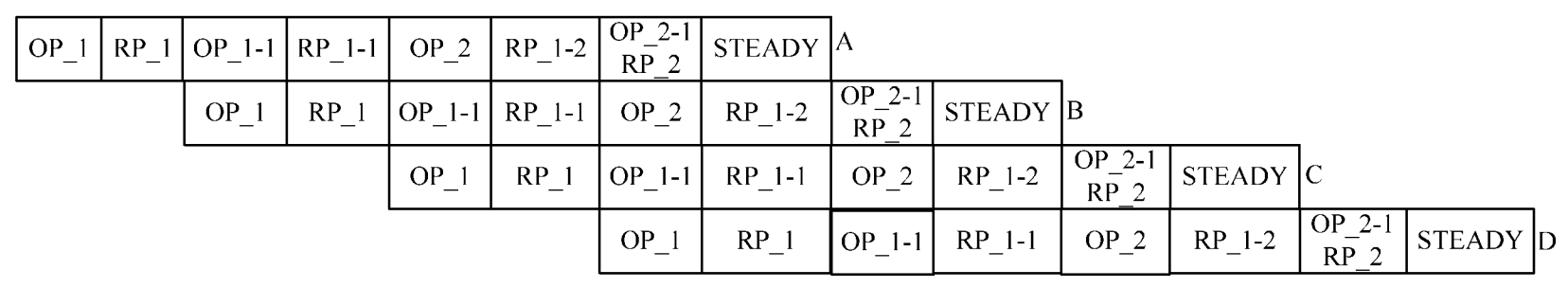

In this embodiment, as shown in FIG. 7, according to a G993.5 VECTOR (vector) standard, a joining process of the subscriber lines is divided into downstream vectoring steps: OP (downstream) VECTOR 1, OP VECTOR 1-1, OP VECTOR 2, and OP VECTOR 2-1 (OP_1, OP_1-1, OP_2, and OP_2-1 for short), and upstream vectoring steps: RP (upstream) VECTOR 1, RP VECTOR 1-1, RP VECTOR 1-2, and RP VECTOR 2 (RP_1, RP_1-1, RP_1-2, and RP_2 for short). In a DSL system, during a joining process, each subscriber line sequentially passes through OP_1, RP_1, OP_1-1, RP_1-1, OP_2, RP_1-2, and OP_2-1 into which RP_2 is merged. STEADY indicates a steady online state that a subscriber line reaches ultimately after passing through the joining process.

202. Put all the group-A subscriber lines into a joining process.

As shown in FIG. 7, during the joining process of the group-A subscriber lines, the group-A subscriber lines sequentially pass through OP_1, RP_1, OP_1-1, RP_1-1, OP_2, RP_1-2, and OP_2-1 into which RP_2 is merged.

203. During the joining process of the group-A subscriber lines, when the group-A subscriber lines reach a starting moment of OP_1-1, put all the group-B subscriber lines into a joining process.

As shown in FIG. 7, during the joining process of the group-B subscriber lines, the group-B subscriber lines sequentially pass through OP_1, RP_1, OP_1-1, RP_1-1, OP_2, RP_1-2, and OP_2-1 into which RP_2 is merged.

204. Align vectoring steps of all the group-B subscriber lines with corresponding vectoring steps of all the group-A subscriber lines, and estimate a crosstalk channel of each aligned vectoring step.

Figure 8:
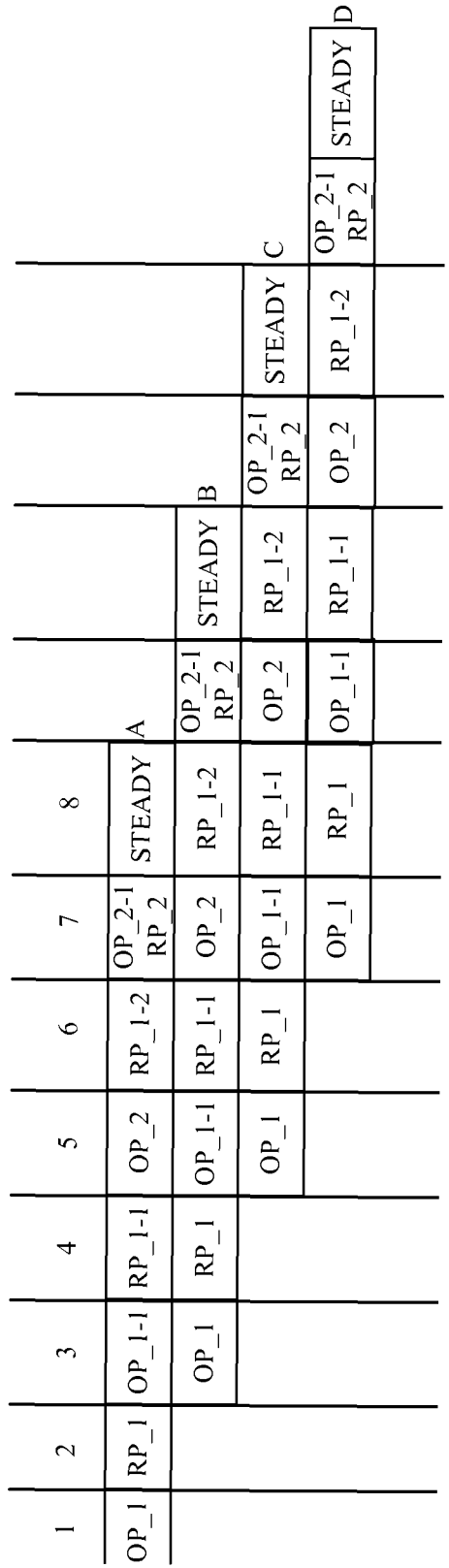
FIG. 8 is a schematic diagram of estimating a crosstalk channel in the method shown in FIG. 6.

As shown in FIG. 7, in this step, specifically, OP_1 of the group-B subscriber lines is aligned with OP_1-1 of the group-A subscriber lines; and then, as shown in FIG. 8, crosstalk channels of aligned vectoring steps in the third column are estimated. As the joining process is performed, RP_1 of the group-B subscriber lines is aligned with RP_1-1 of the group-A subscriber lines; and then, as shown in FIG. 8, crosstalk channels of aligned vectoring steps in the fourth column are estimated.

205. During the joining process of the group-B subscriber lines, when the group-B subscriber lines reach a starting moment of OP_1-1, put all the group-C subscriber lines into a joining process.

As shown in FIG. 7, during the joining process of the group-C subscriber lines, the group-C subscriber lines sequentially pass through OP_1, RP_1, OP_1-1, RP_1-1, OP_2, RP_1-2, and OP_2-1 into which RP_2 is merged.

206. Align vectoring steps of all the group-C subscriber lines with corresponding vectoring steps of all the group-B subscriber lines and the group-A subscriber lines, and estimate a crosstalk channel of each aligned vectoring step.

As shown in FIG. 7, in this step, specifically, OP_1 of the group-C subscriber lines, OP_1-1 of the group-B subscriber lines, and OP_2 of the group-A subscriber lines are aligned; and then, as shown in FIG. 8, crosstalk channels of aligned vectoring steps in the fifth column are estimated. As the joining process is performed, RP_1 of the group-C subscriber lines, RP_1-1 of the group-B subscriber lines, and RP_1-2 of the group-A subscriber lines are aligned; and then, as shown in FIG. 8, crosstalk channels of aligned vectoring steps in the sixth column are estimated.

In the following, estimated content is specifically described by using the sixth column as an example. During an estimating process of the sixth column, the following is mainly estimated: an impact of RP_1 of the group-C subscriber lines on the STEADY state (the steady online state) of a subscriber line (not shown in the diagram) whose joining process is complete; an impact of RP_1 of the group-C subscriber lines on RP_1-2 of the group-A subscriber lines; an impact of RP_1-1 of the group-B subscriber lines on the STEADY state of a subscriber line whose joining process is complete; an impact of RP_1-1 of the group-B subscriber lines on RP_1-2 of the group-A subscriber lines; an impact of the STEADY state of a subscriber line whose joining process is complete on RP_1-2 of the group-A subscriber lines; and an impact of RP_1-2 of the group-A subscriber lines on RP_1-2 of the group-A subscriber lines.

207. During the joining process of the group-C subscriber lines, when the group-C subscriber lines reach a starting moment of OP_1-1, put all the group-D subscriber lines into a joining process.

As shown in FIG. 7, during the joining process of the group-D subscriber lines, the group-D subscriber lines sequentially pass through OP_1, RP_1, OP_1-1, RP_1-1, OP_2, RP_1-2, and OP_2-1 into which RP_2 is merged.

208. Align vectoring steps of all the group-D subscriber lines with corresponding vectoring steps of all the group-C subscriber lines, the group-B subscriber lines, and the group-A subscriber lines, and estimate a crosstalk channel of each aligned vectoring step.

As shown in FIG. 7, in this step, specifically, OP_1 of the group-D subscriber lines, OP_1-1 of the group-C subscriber lines, OP_2 of the group-B subscriber lines, and OP_2-1, into which RP_2 is merged, of the group-A subscriber lines are aligned; and then, as shown in FIG. 8, crosstalk channels of aligned vectoring steps in the seventh column are estimated. As the joining process is performed, RP_1 of the group-D subscriber lines, RP_1-1 of the group-C subscriber lines, and RP_1-2 of the group-B subscriber lines are aligned; and then, as shown in FIG. 8, crosstalk channels of aligned vectoring steps in the eighth column are estimated.

During an estimating process of the seventh column, the following is mainly estimated: an impact of OP_1 of the group-D subscriber lines on the STEADY state of a subscriber line (not shown in the diagram) whose joining process is complete; an impact of OP_1-1 of the group-C subscriber lines on the STEADY state of a subscriber line (not shown in the diagram) whose joining process is complete; an impact of OP_1 of the group-D subscriber lines on OP_2-1 of the group-A subscriber lines; an impact of OP_1-1 of the group-C subscriber lines on OP_2-1 of the group-A subscriber lines; an impact of OP_2-1 of the group-A subscriber lines on OP_2-1 of the group-A subscriber lines; and an impact of the STEADY state of a subscriber line (not shown in the diagram) whose joining process is complete on OP_2-1 of the group-A subscriber lines.

According to the method for enabling subscriber lines to join a DSL vectoring system provided in this embodiment of the present invention, subscriber lines are grouped into four groups according to time when the subscriber lines request to go online, that is, group-A, group-B, group-C, and group-D subscriber lines according to a sequence of time of requesting to go online; when the group-A subscriber lines reach a starting moment of OP_1-1, the group-B subscriber lines join the DSL vectoring system; and in this manner, joining of the group-C and group D subscriber lines is sequentially completed. In this way, groups of subscriber lines that are in different joining processes can coexist, and it is not required that subscriber lines in a next group join the DSL vectoring system until the entire joining process of subscriber lines in a previous group is complete, thereby maximally shortening overall joining time of the subscriber lines in a DSL system and maximally saving a common resource.

Figure 9:
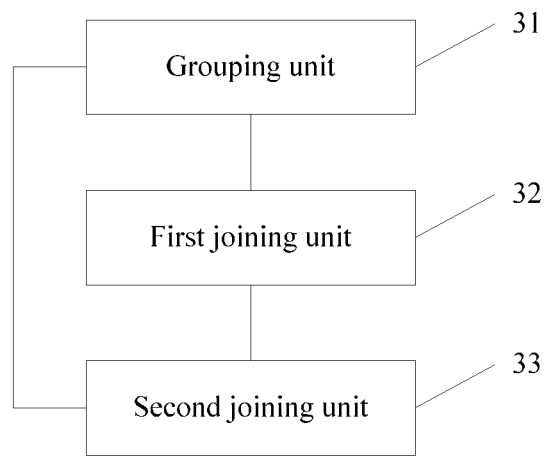
FIG. 9 is a block diagram of an apparatus for enabling subscriber lines to join a DSL vectoring system according to an embodiment of the present invention.

Accordingly, an embodiment of the present invention further provides an apparatus for enabling subscriber lines to join a DSL vectoring system. As shown in FIG. 9, the apparatus includes: a grouping unit 31, a first joining unit 32, and a second joining unit 33.

The grouping unit 31 is configured to group subscriber lines into at least two groups according to time when the subscriber lines request to go online, where the at least two groups of subscriber lines that are obtained after the grouping include a first group of subscriber lines and a second group of subscriber lines, and time when all subscriber lines in the first group of subscriber lines request to go online is earlier than time when all subscriber lines in the second group of subscriber lines request to go online.

There may be many manners of grouping the subscriber lines into at least two groups according to the time when the subscriber lines request to go online. Preferably, the subscriber lines may be grouped into at least two groups according to a principle that all subscriber lines in each group of subscriber lines have same or similar time of requesting to go online.

The first joining unit 32 is configured to put all the subscriber lines in the first group of subscriber lines that are obtained after the grouping by the grouping unit 31 into a joining process.

In this embodiment of the present invention, during the joining process, all the subscriber lines in the first group of subscriber lines and all the subscriber lines in the second group of subscriber lines sequentially pass through a downstream vectoring step 1, an upstream vectoring step 1, a downstream vectoring step 2, an upstream vectoring step 2, a downstream vectoring step 3, an upstream vectoring step 3, and an upstream and downstream vectoring step 4, and specified vectoring steps are the downstream vectoring step 1, the downstream vectoring step 2, the downstream vectoring step 3, and the upstream and downstream vectoring step 4. Certainly, vectoring steps which each subscriber line passes through during the joining process are not limited by this embodiment of the present invention. A person skilled in the art can decide, according to common knowledge or commonly used technical means, the vectoring steps which each subscriber line passes through during the joining process.

The second joining unit 33 is configured to: during the joining process of the first group of subscriber lines, when the first group of subscriber lines reach a starting moment of the specified vectoring step, put all the subscriber lines in the second group of subscriber lines that are obtained after the grouping by the grouping unit 31 into a joining process.

According to the apparatus for enabling subscriber lines to join a DSL vectoring system provided in this embodiment of the present invention, the grouping unit 31 groups subscriber lines into at least two groups according to time when the subscriber lines request to go online, including a first group of subscriber lines with earlier time of requesting to go online and a second group of subscriber lines with later time of requesting to go online; during a joining process of the first group of subscriber lines, when the first group of subscriber lines reach a starting moment of a specified vectoring step, the second joining unit 33 starts to enable the second group of subscriber lines to join the DSL vectoring system later, so that groups of subscriber lines that are in different joining processes can coexist, and it is not required that the second group of subscriber lines join the DSL vectoring system until the entire joining process of the first group of subscriber lines is complete, thereby shortening overall joining time of the subscriber lines in a DSL system and saving a common resource.

In an embodiment provided by the present invention, the specified vectoring steps are specified vectoring steps which are to be passed through by the first group of subscriber lines during the joining process. This embodiment can maximally shorten overall joining time of subscriber lines in the DSL vectoring system and maximally save a common resource.

Figure 10:
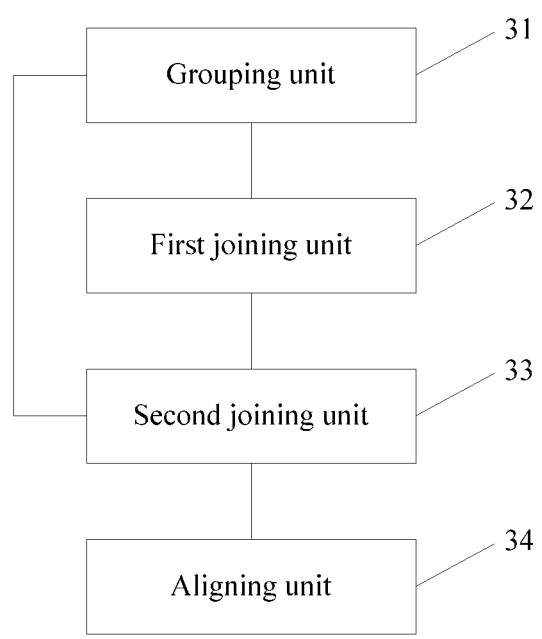
FIG. 10 is a block diagram of another apparatus for enabling subscriber lines to join a DSL vectoring system according to an embodiment of the present invention.

In another embodiment provided by the present invention, as shown in FIG. 10, the apparatus further includes an aligning unit 34, configured to: after the second joining unit 33 starts to enable the second group of subscriber lines to join the DSL vectoring system later, align vectoring steps of all the subscriber lines in the second group of subscriber lines with corresponding vectoring steps of all the subscriber lines in the first group of subscriber lines.

Figure 11:
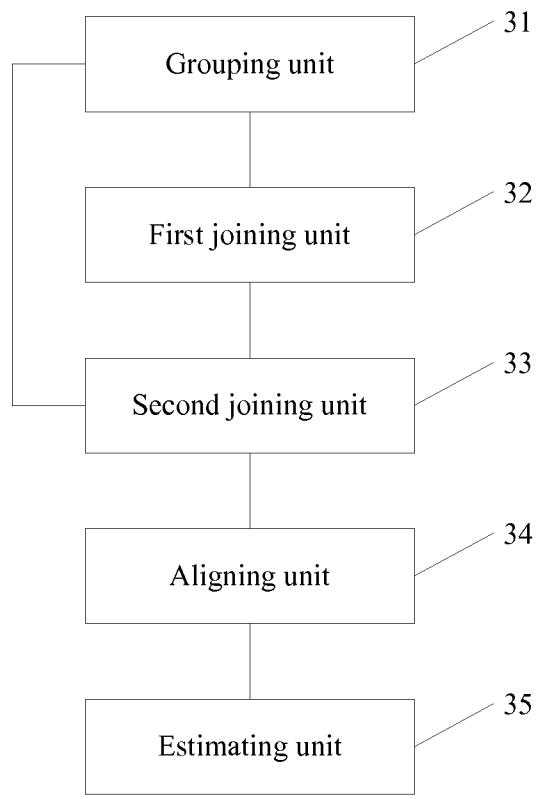
FIG. 11 is a block diagram of another apparatus for enabling subscriber lines to join a DSL vectoring system according to an embodiment of the present invention.

In another embodiment provided by the present invention, as shown in FIG. 11, the apparatus further includes an estimating unit 35, configured to: after the aligning unit 34 aligns the vectoring steps of all the subscriber lines in the second group of subscriber lines with the corresponding vectoring steps of all the subscriber lines in the first group of subscriber lines, estimate a crosstalk channel of each aligned vectoring step.

Figure 12:
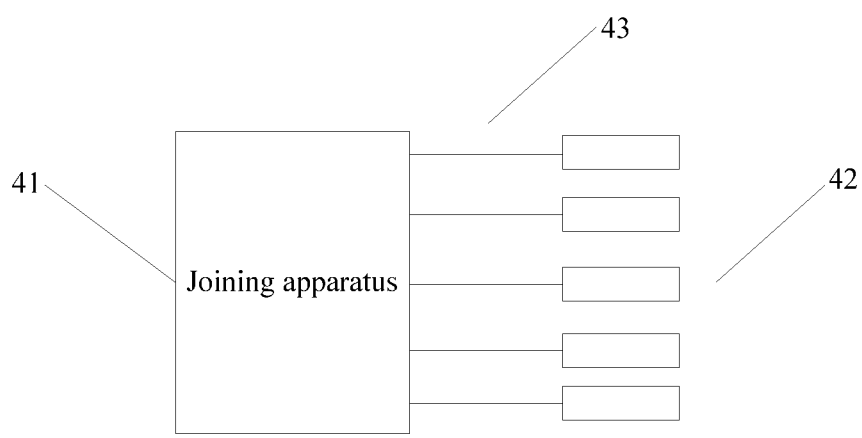
FIG. 12 is a block diagram of a DSL vectoring system according to an embodiment of the present invention.

Accordingly, an embodiment of the present invention further provides a DSL vectoring system. As shown in FIG. 12, the system includes: a joining apparatus 41, multiple CPEs 42, and subscriber lines 43 that connect each of the CPEs 42 and the joining apparatus 41.

The CPEs 42 are configured to request to go online to the joining apparatus 41.

The joining apparatus 41 is configured to: group, according to time when subscriber lines 43 request to go online which is a common expression of the time when CPEs connected to the subscriber lines 43 request to go online, the subscriber lines 43 into at least two groups, where the at least two groups of subscriber lines that are obtained after the grouping include a first group of subscriber lines and a second group of subscriber lines, and time when all subscriber lines in the first group of subscriber lines request to go online is earlier than time when all subscriber lines in the second group of subscriber lines request to go online; start a joining process for all the subscriber lines in the first group of subscriber lines; and during the joining process of the first group of subscriber lines, when the first group of subscriber lines reach a starting moment of a specified vectoring step, put all the subscriber lines in the second group of subscriber lines into a joining process.

The joining apparatus 41 may use the apparatus for enabling subscriber lines to join a DSL vectoring system provided in the foregoing embodiments of the present invention, which is not further described herein.

The DSL vectoring system provided in this embodiment of the present invention includes a joining apparatus 41, multiple CPEs 42, and subscriber lines 43 that connect each of the CPEs 42 and the joining apparatus 41. The CPEs 42 are configured to request to go online to the joining apparatus 41. The joining apparatus 41 groups the subscriber lines into at least two groups according to time when the subscriber lines request to go online, including a first group of subscriber lines with earlier time of requesting to go online and a second group of subscriber lines with later time of requesting to go online; and then during a joining process of the first group of subscriber lines, when the first group of subscriber lines reach a starting moment of a specified vectoring step, the joining apparatus 41 starts to enable the second group of subscriber lines to join the DSL vectoring system later, so that groups of subscriber lines that are in different joining processes can coexist, and it is not required that the second group of subscriber lines join the DSL vectoring system until the entire joining process of the first group of subscriber lines is complete, thereby shortening overall joining time of the subscriber lines in the DSL system and saving a common resource.

Based on the foregoing descriptions of the implementation manners, a person skilled in the art may clearly understand that the present invention may be implemented by software in addition to necessary universal hardware or by hardware only. In most circumstances, the former is a preferred implementation manner. Based on such an understanding, the technical solutions of the present invention essentially or the part contributing to the prior art may be implemented in a form of a software product. The software product is stored in a readable storage medium, such as a floppy disk, a hard disk or an optical disc of a computer, and includes several instructions for instructing a computer device (which may be a personal computer, a server, or a network device) to perform the methods described in the embodiments of the present invention.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method comprising:
grouping, into a plurality of groups, subscriber lines that request to join a digital subscriber line (DSL) vectoring system during an initialization process of the DSL system according to a DSL vectoring technique, the initialization process comprising a plurality of vectoring steps arranged in an order and the subscriber lines passing through the plurality of vectoring steps according to the order for joining the DSL vectoring system in a joining process, wherein each of the plurality of vectoring steps can be a downstream type or an upstream type, wherein the subscriber lines are grouped according to time when the subscriber lines request to join the DSL vectoring system, wherein the plurality of groups comprise a first group and a second group, and wherein subscriber lines in the first group request to join the DSL vectoring system earlier than subscriber lines in the second group;
starting a first joining process for the subscriber lines in the first group to join the DSL vectoring system, each of the subscriber lines in the first group passing through the plurality of vectoring steps in the order; and
during the first joining process, starting a second joining process for the subscriber lines in the second group to join the DSL vectoring system at a time point when the subscriber lines in the first group are passing through a first vectoring step in the plurality of vectoring steps, each of the subscriber lines in the second group passing through the plurality of vectoring steps in the order.

2. The method according to claim 1, wherein grouping the subscriber lines comprises grouping the subscriber lines into the plurality of groups such that each group has subscriber lines that request to join the DSL vectoring system at a same or a similar time.

3. The method according to claim 1, further comprising, after starting the second joining process for the subscriber lines in the second group to join the DSL vectoring system, aligning vectoring steps that the subscriber lines in the second group are passing through with vectoring steps that the subscriber lines in the first group are passing through.

4. The method according to claim 3, wherein after aligning the vectoring steps of the subscriber lines in the second group with the vectoring steps of the subscriber lines in the first group, the method further comprises estimating a crosstalk channel of each aligned vectoring step.

5. The method according to claim 1, wherein the time point is determined based on when the subscriber lines in the second group request to join the DSL vectoring system.

6. The method according to claim 5, wherein the first vectoring step is after a second vectoring step in the plurality of vectoring steps that the first group is passing through when the subscriber lines in the second group request to join the DSL vectoring system, wherein the first vectoring step has a same downstream type or upstream type as a starting vectoring step, wherein the starting vectoring step is a vectoring step in the plurality of vectoring steps that each subscriber line firstly passes through according to the order.

7. The method according to claim 1, wherein the plurality of vectoring steps comprises a downstream vectoring step 1, an upstream vectoring step 1, a downstream vectoring step 2, an upstream vectoring step 2, a downstream vectoring step 3, an upstream vectoring step 3, and an upstream and downstream vectoring step 4, and the first vectoring step comprises the downstream vectoring step 1, the downstream vectoring step 2, the downstream vectoring step 3, and the upstream and downstream vectoring step 4.

8. A telecommunications apparatus comprising:
a processor; and
a memory storing instructions to be executed by the processor, such that the processor is programmed by the instructions to:
group subscriber lines into a plurality of groups, the subscriber lines requesting to join a digital subscriber line (DSL) vectoring system during an initialization process of the DSL vectoring system according to a DSL vectoring technique for eliminating crosstalk between the subscriber lines, the initialization process comprising a plurality of vectoring steps arranged in an order and the subscriber lines passing through the plurality of vectoring steps according to the order for joining the DSL vectoring system in a joining process, wherein each of the plurality of vectoring steps can be a downstream type or an upstream type, wherein the subscriber lines are grouped according to time when the subscriber lines request to join the DSL vectoring system, wherein the plurality of groups comprise a first group of subscriber lines and a second group of subscriber lines, and wherein subscriber lines in the first group of subscriber lines request to join the DSL vectoring system earlier than subscriber lines in the second group of subscriber lines;
start a first joining process for the subscriber lines in the first group of subscriber lines to join the DSL vectoring system, each of the subscriber lines in the first group of subscriber lines passing through the plurality of vectoring steps in the order; and
during the first joining process of the first group of subscriber lines, start a second joining process for the subscriber lines in the second group of subscriber lines to join the DSL vectoring system at a time point when the subscriber lines in the first group of subscriber lines are passing through a first vectoring step in the plurality of vectoring steps, each of the subscriber lines in the second group of subscriber lines passing through the plurality of vectoring steps in the order during the second joining process.

9. The telecommunications apparatus according to claim 8, wherein the subscriber lines are grouped into the plurality of groups such that each group includes subscriber lines that request to join the DSL vectoring system at a same or a similar time.

10. The telecommunications apparatus according to claim 8, wherein the instructions further program the processor to align vectoring steps that the subscriber lines in the second group of subscriber lines are passing through with vectoring steps that the subscriber lines in the first group of subscriber lines are passing through after the second joining process has started for the second group of subscriber lines to join the DSL vectoring system.

11. The telecommunications apparatus according to claim 10, wherein the instructions further program the processor to estimate a crosstalk channel of each aligned vectoring step after the vectoring steps of the subscriber lines in the second group of subscriber lines are aligned with the vectoring steps of the subscriber lines in the first group of subscriber lines.

12. The telecommunications apparatus according to claim 8, wherein the plurality of vectoring steps comprises a downstream vectoring step 1, an upstream vectoring step 1, a downstream vectoring step 2, an upstream vectoring step 2, a downstream vectoring step 3, an upstream vectoring step 3, and an upstream and downstream vectoring step 4, and the first vectoring step comprises the downstream vectoring step 1, the downstream vectoring step 2, the downstream vectoring step 3, and the upstream and downstream vectoring step 4.

13. The telecommunications apparatus according to claim 8, wherein the telecommunications apparatus comprises a server.

14. The telecommunications apparatus according to claim 8, wherein the telecommunications apparatus comprises a network device.

15. A DSL vectoring system, wherein the DSL vectoring system comprises:
   a joining apparatus;
   a plurality of customer premises equipments (CPEs) corresponding to subscriber lines; and
   a plurality of subscriber lines that connect the CPEs and the joining apparatus;
   wherein the CPEs are configured to send requests for the corresponding subscriber lines to join the joining apparatus during an initialization process of the DSL vectoring system according to a DSL vectoring technique, the initialization process comprising a plurality of vectoring steps arranged in an order and the subscriber lines passing through the plurality of vectoring steps according to the order for joining the joining apparatus in a joining process, wherein each of the plurality of vectoring steps can be a downstream type or an upstream type; and
   wherein the joining apparatus is configured to group the subscriber lines corresponding to the CPEs that request to join the joining apparatus into a first group of subscriber lines and a second group of subscriber lines, wherein subscriber lines in the first group of subscriber lines request to join the joining apparatus earlier than subscriber lines in the second group of subscriber lines; and
   wherein the joining apparatus is configured to start a first joining process for the subscriber lines in the first group of subscriber lines, each of the subscriber lines in the first group of subscriber lines passing through the plurality of vectoring steps in the order during the first joining process, and, during the first joining process of the first group of subscriber lines, start a second joining process for the subscriber lines in the second group of subscriber lines at a time point when the subscriber lines in the first group of subscriber lines are passing through a first vectoring step in the plurality of vectoring steps, each of the subscriber lines in the second group of subscriber lines passing through the plurality of vectoring steps in the order during the second joining process, wherein the time point is determined based on when the second group of subscriber lines request to join the joining apparatus.

16. The DSL vectoring system according to claim 15, wherein the joining apparatus comprises a processor and a memory storing instructions to be executed by the processor.

17. The DSL vectoring system according to claim 16, wherein the subscriber lines are grouped such that each group of subscriber lines include subscriber lines that request to join the joining apparatus at a same or a similar time.

18. The DSL vectoring system according to claim 16, wherein the processor executes the instructions to align vectoring steps that the subscriber lines in the second group of subscriber lines are passing through with vectoring steps that the subscriber lines in the first group of subscriber lines are passing through after the second joining process has started.

19. The DSL vectoring system according to claim 18, wherein the processor further executes the instructions to estimate a crosstalk channel of each aligned vectoring step.

20. The DSL vectoring system according to claim 16, wherein the plurality of vectoring steps comprises a downstream vectoring step 1, an upstream vectoring step 1, a downstream vectoring step 2, an upstream vectoring step 2, a downstream vectoring step 3, an upstream vectoring step 3, and an upstream and downstream vectoring step 4, and the first vectoring step comprises the downstream vectoring step 1, the downstream vectoring step 2, the downstream vectoring step 3, and the upstream and downstream vectoring step 4.

* * * * *